March 20, 1962 H. J. ACKERMANN 3,026,139
END GATE FOR WAGON BOXES
Filed March 17, 1960
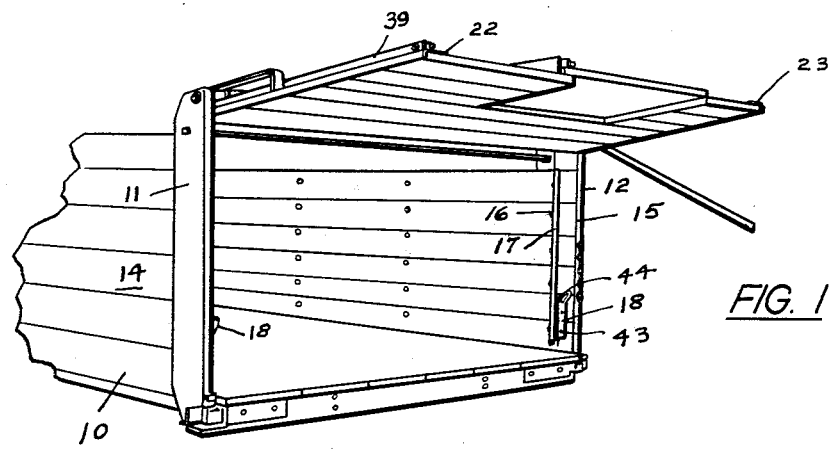
FIG. 1
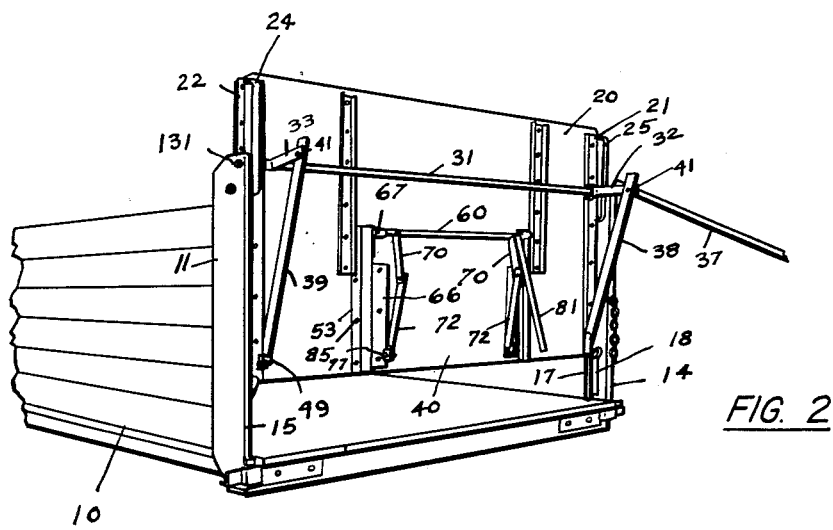
FIG. 2
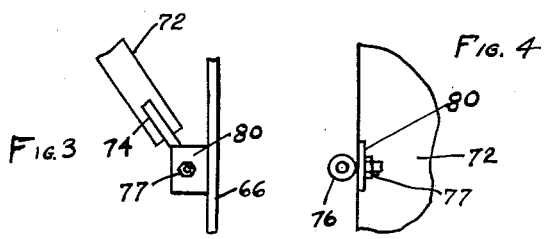
INVENTOR.
HARRY J. ACKERMANN
BY
Charles L. Lovercheck
attorney

United States Patent Office 3,026,139
Patented Mar. 20, 1962

3,026,139
END GATE FOR WAGON BOXES
Harry J. Ackermann, Reinbeck, Iowa
Filed Mar. 17, 1960, Ser. No. 15,567
2 Claims. (Cl. 296—56)

This invention relates to containers and bodies for vehicles and, more particularly, to wagon boxes.

This application is a continuation in part of patent application, Serial No. 745,742, filed June 30, 1958, now Patent No. 2,951,726, and constitutes an improvement thereover.

In previous wagon boxes of this type it was not possible to conveniently open the rear gate of the box a small amount and yet be able to swing the entire rear gate to an open position.

It is, accordingly, an object of the present invention to provide an improved wagon and gate therefor.

Another object of the invention is to provide an improved wagon gate which will move vertically to dispense material at a controlled rate and which can be completely moved upwardly to dispense the entire volume of material from the wagon box.

A further object of the invention is to provide a wagon box which is simple in construction, economical to manufacture, and simple and efficient to operate.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an isometric view of a wagon box with the rear gate swung wide open;

FIG. 2 is a view of the wagon box showing the rear gate raised an incremental amount;

FIG. 3 is an enlarged view of the fastening means for the gate; and

FIG. 4 is a side view of a part of the fastening means shown in FIG. 3.

Now with more particular reference to the drawing, a wagon box 10 is shown having side plates 11 and 12 attached to the respective sides thereof to reinforce side members 14 and 15. The plates 11 and 12 may be made of sheet metal with bolts 16 extending therethrough to clamp front cleats 17 thereto and sandwich the boards of the side members 14 and 15 therebetween.

The cleats 17 may be made of angular members having one leg thereof lying along the side members 14 and 15 and the other leg extending straight laterally outwardly to form a barrier against which a gate 20 may slide.

The gate 20 has wear plates 21 and 22 attached thereto by suitable bolts as shown. U-shaped chain members 24 and 25 are fastened to the gate 20. The members 24 and 25 may have their ends threaded and may extend through the wear plates 21 and 22.

A transverse rod 31 may be square in cross section and extends through holes in the side plates 11 and 12 and has suitable nuts 131 on the outer end thereof. Lifting arms 32 and 33 are welded to the transverse rod 31 and form cranks thereon. Links 38 and 39 are pivotally connected at their lower ends to the wear plates 21 and 22 and are pivotally connected at their upper ends at 41 to the arms 32 and 33. Links 72 are connected by means of bolts 77 to wear plates 66 by lugs 80 which are welded to the wear plates 66.

Rear cleats 18 extend over a limited part of the box depth and have a straight lower portion which is attached to the side members 14 and 15 by suitable bolts 43 and the upper ends thereof curve backward at 44 to form a convenient guide to guide the lower ends of the wear plates 21 and 22 into the space therebetween.

A handle 37 is rotatably fixed to the rod 31. When the handle 37 is rotated, it rotates the rod 31 which swings the cranks or arms 32 and 33, thereby pulling the links 38 and 39 upwardly and causing the rear gate 20 to slide up in the space between the front cleats 17 and the rear cleats 18. When the gate reaches the upper end of the rear cleat 18, that is, the approximate position shown in FIG. 2, it will swing out and may be swung up to the position shown in FIG. 1. It may be stopped at any point in its upward travel in between the upper and lower ends of the cleat 18; that is, anywhere between the position shown in FIG. 2 and the closed position. Grain or other material will therefore be dispensed therebetween at a controlled rate.

If it is desired to dispense only a small amount of grain or other material, a small gate 40 may be opened. The small gate 40 is slidably supported between an angle 53 and the back part of the gate. The angle 53 is attached to the gate by means of bolts 85 and a wear plate 66 is fixed to the gate 40. The lower ends of a link 72 are swingably connected to the wear plate 66 and the upper ends are swingably connected to arms 70. The arms 70 are fixed to a rod 60 and swing therewith. The ends of the rod 60 are rotatably supported in hinge members 67 which are fixed to the large gate 20. Therefore, when an arm 81 is rotated upwardly, the arms 70 will pull the links 72 to slide the gate 40 up between the angle 53 and the large gate 20.

The large gate 20 may be opened a certain amount to allow a considerable flow of material. The small gate 40 may then be opened to give a slightly greater flow.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A wagon box comprising a bottom, side members having front cleats supported on the rear end thereof and extending vertically from the top to the bottom thereof and spaced from the rear edge thereof, a large gate, a transverse rod extending between and connected to the sides of said wagon box, arm members supported on said transverse rod, links attached to said arm members and connected to said gate, a handle attached to said transverse rod rotating it to swing said rod and said arm members to lift said gate, rear cleats spaced rearwardly from said front cleats and attached to said side members of said wagon box and extending upwardly a limited distance from the bottom thereof, said gate being adapted to slide between said rear cleats and said front cleats, a curved portion on the upper ends of said rear cleats for guiding the lower edge of said gate between said cleats, said gate being swingably supported on said rod and swingable over said rear cleats after it has been moved upward a limited distance, said rod restraining the upper part of said gate against rearward movement, said rear cleats supporting the lower end of said gate to hold it against rearward movement for sliding movement during a part of its upward movement only.

2. The wagon box recited in claim 1 wherein a small opening is provided adjacent the central lower part of said large gate and a small gate is slidably supported over said opening, spaced cleats on said large gate adjacent said small opening, said small gate slidable between said cleats and said large gate, a small rod rotatably supported on said large gate above said small opening, arms fixed to said small rod, links attached to said small gate at their lower ends and to said arms at their upper ends, and a handle for rotating said small rod whereby said small gate is caused to slide to an open position over said opening in said large gate.

References Cited in the file of this patent

UNITED STATES PATENTS

| | | |
|---|---|---|
| 1,035,011 | Hopper | Aug. 6, 1912 |
| 1,724,384 | Wetzel | Aug. 13, 1929 |
| 2,635,688 | Bruning | Apr. 21, 1953 |
| 2,745,696 | Weatherly | May 15, 1956 |